(12) United States Patent
Viswanathan et al.

(10) Patent No.: US 11,519,749 B2
(45) Date of Patent: Dec. 6, 2022

(54) APPARATUS AND METHOD FOR DYNAMIC NAVIGATION OF A SELECTED GEOGRAPHICAL ZONE

(71) Applicant: Naver Corporation, Gyeonggi-do (KR)

(72) Inventors: Sruthi Viswanathan, Grenoble (FR); Cécile Boulard, Grenoble (FR); Maria Antonietta Grasso, Grenoble (FR); Fabien Guillot, Vaulnaveys le Haut (FR)

( * ) Notice: Subject to any disclaimer, the term of this patent is extended or adjusted under 35 U.S.C. 154(b) by 236 days.

(21) Appl. No.: 16/893,573

(22) Filed: Jun. 5, 2020

(65) Prior Publication Data
US 2021/0381840 A1 Dec. 9, 2021

(51) Int. Cl.
*G01C 21/36* (2006.01)
*G01C 21/34* (2006.01)
(Continued)

(52) U.S. Cl.
CPC ......... *G01C 21/3682* (2013.01); *G01C 21/20* (2013.01); *G01C 21/3476* (2013.01);
(Continued)

(58) Field of Classification Search
CPC .................................. G01C 21/3682
See application file for complete search history.

(56) References Cited

U.S. PATENT DOCUMENTS

| 9,066,199 B2 | 6/2015 | Forstall et al. | |
|---|---|---|---|
| 2003/0156119 A1* | 8/2003 | Bonadio | G06F 3/0482 345/589 |

(Continued)

FOREIGN PATENT DOCUMENTS

| EP | 2287567 A1 * | 2/2011 | ............ G01C 21/32 |
|---|---|---|---|
| EP | 2610589 A1 * | 7/2013 | ......... G01C 21/3682 |

(Continued)

OTHER PUBLICATIONS

Sato Y. et al., translation of JP 3606736 B2, from PE2E Search (Year: 2005).*

(Continued)

*Primary Examiner* — Vivek D Koppikar
*Assistant Examiner* — Andrew James Trettel

(57) ABSTRACT

There is provided a handheld device for navigating about a selected geographical zone. The handheld navigating device includes a processor circuit with a screen on which an image representative of a geographical map of a selected geographical zone is displayed. The geographical map of the selected geographical zone includes representations corresponding respectively with points of interest having locations and categories. The geographical map is configured so that (a) at least part of the representations corresponding respectively with points of interest are clustered within at least one viewing area, (b) the at least one viewing area is distinguished by a visible pattern having both a selected appearance and a first visual state that do not reveal the locations and the categories of the points of interest. The handheld navigation device includes a geographical position locating subsystem for determining when a selected relationship exists between the user and one or more of the points of interest. Responsive to the selected relationship existing, the processor circuit changes the appearance of at least part of the visible pattern to both reflect that the at least one viewing area has been transformed from the first visual state to a second visual state and the extent to which the user has traversed the physical area.

20 Claims, 7 Drawing Sheets

(51) Int. Cl.
*G09G 5/37* (2006.01)
*G01C 21/20* (2006.01)
*G09G 5/02* (2006.01)
*G09B 29/00* (2006.01)

(52) U.S. Cl.
CPC ......... *G01C 21/3667* (2013.01); *G09G 5/026* (2013.01); *G09G 5/37* (2013.01); *G09B 29/007* (2013.01); *G09G 2354/00* (2013.01)

(56) References Cited

U.S. PATENT DOCUMENTS

| | | | | |
|---|---|---|---|---|
| 2010/0131850 A1* | 5/2010 | Berus | ................... | G01C 21/367 715/862 |
| 2013/0079033 A1* | 3/2013 | Gupta | ................... | H04W 64/00 455/456.2 |
| 2014/0052763 A1* | 2/2014 | Sato | ........................ | G06F 16/21 707/805 |
| 2015/0187127 A1* | 7/2015 | Jones | ...................... | G06T 19/20 345/426 |
| 2018/0094940 A1* | 4/2018 | Rothschild | .............. | G06F 9/452 |
| 2018/0349413 A1* | 12/2018 | Shelby | ................. | G01C 21/206 |

FOREIGN PATENT DOCUMENTS

JP 3606736 B2 * 1/2005 ......... G01C 21/3694
WO WO-2012152982 A1 * 11/2012 ........... G01C 21/367

OTHER PUBLICATIONS

TV Tropes, "Fog of War", https://web.archive.org/web/20200402054508/https://tvtropes.org/pmwiki/pmwiki.php/Main/FogOfWar (Year: 2020).*

* cited by examiner

APPARATUS AND METHOD FOR DYNAMIC NAVIGATION OF A SELECTED GEOGRAPHICAL ZONE

The presented disclosure generally relates to a dynamic navigation system implemented on a mobile device having a user interface. The system is used cooperatively with various hardware and software components, such as a computer, a network and a geographical position locating subsystem, to provide a visual representation of a customized geographical map permitting unconstrained exploration of a selected geographical zone.

BACKGROUND

Smartphones can be used very effectively as navigation devices and their use for such purpose can be particularly enhanced when used in conjunction with a mobile application including a geographical map ("mobile map"). However, in the context of free form or unconstrained navigation of a given geographical zone, such as an urban area, use of a standard mobile map on a smartphone can be counterproductive. That is, when used in conjunction with a mobile map, the smartphone can serve as a habitual assistant on the move. Turn-by-turn navigation can severely diminish the enjoyment associated with unconstrained navigation about the given geographical zone.

To avoid this sort of slavish use of the mobile map, developers of navigation tools for urban exploration have proposed eyes-free interaction to promote freedom of movement while exploring the given geographical zone. In one instance, tactile and audio interfaces have been employed to replace mobile phone screens. These approaches move radically away from navigation using visual ques. Many smartphone users would prefer a form of free form navigation employing a mobile map with visual feedback, as opposed tactile and/or audio interfaces.

Certain approaches employing mobile maps promote unconstrained exploration of urban areas. In one approach, visual clusters representative of areas with a high density of attractions, i.e., points of interest ("POIs"), are displayed on the mobile map. These clusters can be generated with data from social media and may be used to display selected neighborhoods having a particular character or ambience. In one exemplary application of Google Maps, such clusters are distinguished by orange shading. Further improvements in mobile navigation technology promoting unconstrained, yet strategic navigation of selected geographical zones would be desirable.

SUMMARY

In one embodiment there is disclosed a handheld device for navigating about a selected geographical zone including a plurality of points of interest having locations and categories. The handheld navigating device includes a processor circuit and a screen, the screen being communicatively coupled with the processor circuit. The processor circuit causes an image representative of a geographical map of the selected geographical zone to be displayed on the screen, and the geographical map includes representations corresponding respectively with points of interest within the selected geographical zone. The geographical map is configured so that (a) at least part of the representations corresponding respectively with points of interest are clustered within at least one viewing area, (b) the at least one viewing area is distinguished by a visible pattern having a selected appearance that does not reveal the locations and the categories of the points of interest, and (c) the visible pattern having the selected appearance corresponds with a first visual state of the at least one viewing area. A geographical position locating subsystem (such as a global positioning system), communicating with the processor circuit, determines when a selected relationship exists between the user and one or more of the points of interest. Responsive to the geographical locating subsystem determining that the selected relationship exists between the user and the one or more points of interest, the processor circuit changes the appearance of at least part of the visible pattern to reflect that both the at least one viewing area has been transformed from the first visual state of the at least one viewing area to a second visual state of the at least one viewing area and an extent to which the user has traversed a physical area corresponding with the at least one viewing area.

In one example, the appearance of substantially all of the visible pattern is distinguished by a first color, and the processor circuit transforms the appearance of at least part of the visible pattern from the first color to a second color to reflect that the user has physically traversed at least part of the physical area corresponding with the at least one viewing area. In this one example, the geographical position locating subsystem determines that the user has been within a selected distance of a number of the at least part of the representations corresponding respectively with points of interest, and the transformation of the appearance of the at least part of the visible pattern from the first color to the second color varies as a function the number of the at least part of the representations.

In another example, the at least one viewing area is a first viewing area and the first viewing area is transformed from the first visual state to the second visual state while the second viewing area remains in the first visual state to reflect that the user has physically traversed the physical area corresponding with the first viewing area but has not traversed the physical area corresponding with the second viewing area.

In another example, the pattern comprises a representation of a cloud divided into a first representative part having a first color and a second representative part having a second color; the at least part of the plurality of points of interest are clustered within the first representative part of the cloud and at least another part of the plurality of points of interest are clustered within the second representative part of the cloud; and the processor circuit changes the appearance of the at least part of the pattern to reflect that the at least one viewing area has been transformed from the first visual state of the at least one viewing area to the second visual state of the at least one viewing area by either changing the first representative part of the cloud from the first color to a third color or changing the second representative part of the cloud from the second color to the third color.

In yet another example, the geographical map includes a first pattern and a second pattern, wherein the geographical map is provided with a visually distinguishable line connecting the first and second patterns, and wherein the visually distinguishable line corresponds with one of a plurality of relative distance categories.

In yet another example, the pattern includes a representation of a cloud with at least part of the representation of the cloud corresponding to a first color during a first time of a day and the at least part of the representation of the cloud corresponds to a second color during a second time of the day. In this example, the at least part of the representation of the cloud can be changed from either the first color to a third color or from the second color to the third color to reflect an extent to which the user has traversed a physical area corresponding with the at least part of the representation of the cloud.

In yet another example the at least one viewing area corresponds with at least part of a selected urban neighborhood, and the selection of the at least part of the selected urban neighborhood is made on the basis of either perceived popularity of the selected urban neighborhood or points of interest in the selected urban neighborhood.

In yet another example, the user has expresses personal preferences for exploring the selected geographical zone and the at least one viewing area corresponds with at least part of a selected urban neighborhood. Accordingly, selection of the at least part of the selected urban neighborhood is made on the basis of the personal preferences for exploring the selected geographical zone.

In yet another example, the geographical position locating subsystem includes a time tracking subsystem for assessing an amount of time spent by the user near one or more of the points of interest, and the selected relationship exists when the time tracking subsystem assesses that the user has spent a selected amount of time within a selected distance of the one or more physical attractions.

In yet another example, the geographical position locating subsystem includes a global positioning system for determining a distance between the user and the one or more of the points of interest, and the selected relationship exists when the global positioning system determines that the user is within a selected distance of the one or more of the physical attractions sites.

In another example, the handheld navigation device also includes memory for storing information regarding an extent to which the user has visited the physical area corresponding with the at least one viewing area.

DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A. System Architecture

It should be appreciated that the disclosed embodiments can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over communication links. Applications, software programs or computer readable instructions may be referred to as components or modules. Applications may take the form of software executing on a general-purpose computer or be hardwired or hard coded in hardware. Applications may also be downloaded in whole or in part through the use of a software development kit, framework, or toolkit that enables the creation and implementation of the disclosed embodiments. In general, the order of the steps of disclosed processes may be altered within the scope of the disclosed embodiments.

As used herein, the term "client computer" refers to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

Figure 1:
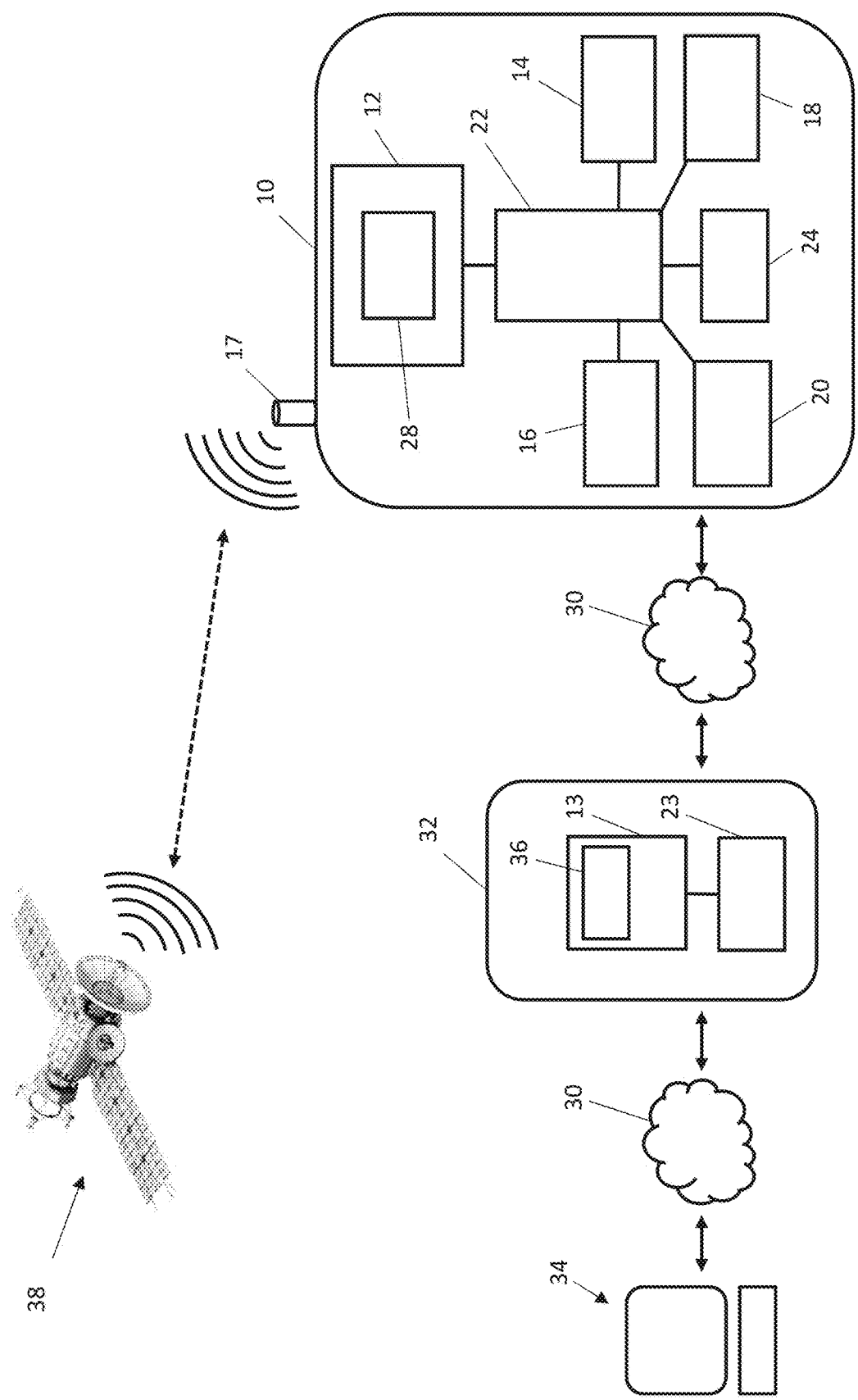
FIG. 1 illustrates a schematic, diagrammatic drawing of a networked system including a mobile device, server and client computer.

With reference to FIG. 1, a block diagram of a system architecture in which a mobile device 10 may operate is illustrated. The mobile device 10 in this embodiment includes: an operating system 12, an input device 14, a radio frequency transceiver(s) 16, an antenna 17, a visual display or screen 18, and a battery or power supply 20. Each of these components is coupled to a processor circuit 22. The mobile device 10 further includes a GPS communications interface 24, the significance of which will appear below. The device operating system 12 runs on the processor circuit 22 and enables interaction between application programs and the mobile device hardware components.

The term processor circuit, as used herein, may encompass a single processor circuit or multiple processor circuits that executes some or all computer readable instructions or computer program code from multiple modules. A client computer embodying the one or more processing circuits may include, but not limited to, CPUs (Central Processing Units), memory/storage devices, communication links, communication/transmitting devices, I/O devices, or any subcomponents or individual parts of one or more processing circuits, including software, firmware, hardware, or any combination or subcombination thereof.

In an embodiment, the mobile device 10 receives and transmits data through the antenna 17 using the RF transceiver(s) 16 which may be able to communicate via various networks, for example: Bluetooth, local area networks such as WiFi, and cellular networks such as GSM or CDMA. In addition, the disclosed embodiments may be used in conjunction with a position locating system including a GPS satellite 38 and the antenna 17. In one embodiment, location information is obtained through use of a GPS communications interface 24 in conjunction with GPS satellite 38 and antenna 17. In an alternate embodiment, location information is obtained through use of the GPS communications interface 24 in conjunction with information stored locally on the mobile device 10.

In an embodiment, a local software component 28 is an application program that is downloaded to the mobile device 10 and installed so that it integrates with the operating system 12. In one embodiment, the local software component 28 can be device, platform or operating system specific.

Referring still to FIG. 1, a server 32 is provided with server software 36 and an operating system 13 that runs on processor circuit 23. The server software 36 on the server 32 includes functionality to allow two-way communication between the server 32 and the mobile device 10, as well as two-way communication between the server 32 and the client computer 34 also through network 30, which in one embodiment is the Internet. The server software 36 on the server 32 may enable the client computer 34 to update information accessible by the mobile device 10, such as points of interest information. The server software 36 may also enable the mobile device 10 to communicate with the client computer 34 to deliver feedback about points of interest information.

Furthermore, the server software 36 may allow points of interest data, such as location-related information, pictures, reviews and ratings to be transferred from the mobile device 10 to the client computer 34 and from the client computer 34 to the mobile device 10. In an embodiment, the server software 36 generates a web page for display on the client computer 34 which allows an authorized user to use remote access and configuration controls relating a general point of interest database on server 32. In an embodiment, the server 32 also includes a database 179 that is used to store backed-up data and other information from the mobile device 10, such as a user specific point of interest database, that the user may share in whole or in part with other users.

Of course, it is understood by those of ordinary skill in the art that the functionality performed by server 32 does not necessarily have to be accomplished on a single hardware device. In this context, the use of the term server is intended to refer to one or more computers operating in cooperation or collaboration to provide the functionality described herein. The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality.

B. System Operation

Referring to FIGS. 2, 3A, 3B and 3C, embodiments of a mobile device 10 illustrating the operation of unconstrained navigation of a geographical zone, such as an urban area, is further described. The embodiments of the mobile device 10 in FIGS. 2, 3A, 3B and 3C may operate within the system architecture of FIG. 1.

Figure 2:
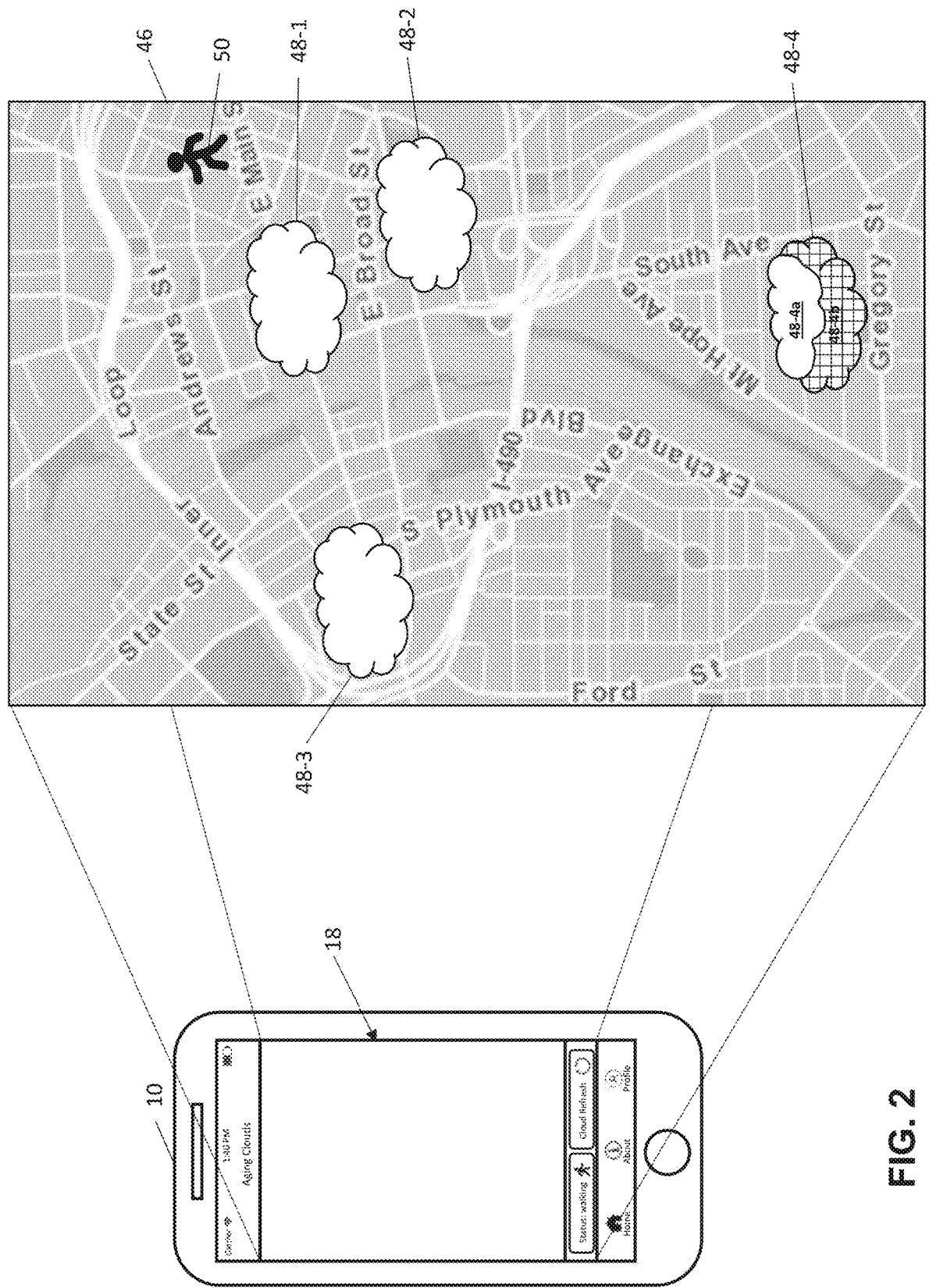
FIG. 2 is a planar view of a mobile phone on which a geographical map, including certain aspects of the disclosed embodiments, is displayed.

In FIG. 2, a map of a selected geographical zone 46 is shown on the visual display or screen 18 of the mobile device 10. In the map of the selected geographical zone are viewing areas that contain points of interest that user 50 may want to explore. Such viewing areas, which are also referred to herein as neighborhoods, are visualized in the selected geographical zone 46 using shapes (which may have colors and/or patterns) that do not reveal the locations and categories of the points of interest thereunder. In the embodiment shown in FIG. 2, such non-transparent shapes are represented using clouds 48-1 through 48-4 (which are referred to collectively herein as clouds 48).

One objective of the disclosed embodiments is to support a user in selecting a certain interesting neighborhood as well as deciding whether to leave or stay in the current neighborhood. In one example shown in FIG. 2, the clouds 48 are solid patches placed over interesting urban neighborhoods that have higher resources (or points of interest) than the rest of the area. In another example, the clouds 48 are translucent patches. Whether translucent or solid, clouds 48 do not reveal points of interest that a user 50 may find interesting to explore, or the category that the point of interest belongs to. Instead, the clouds 48 are placed in the geographic zone on the map 46 displayed on the display 18 of a mobile device 10 to aid the user 50 in making exploration plans with ease. That is, the clouds 48 provide an indication that points of interest exist in areas but do not reveal what or where points of interest are in those areas, thereby encouraging the user 46 to explore the areas identified by the clouds 48 on the map 46 without having to rely on the mobile phone 10 when doing so.

Figure 3A:
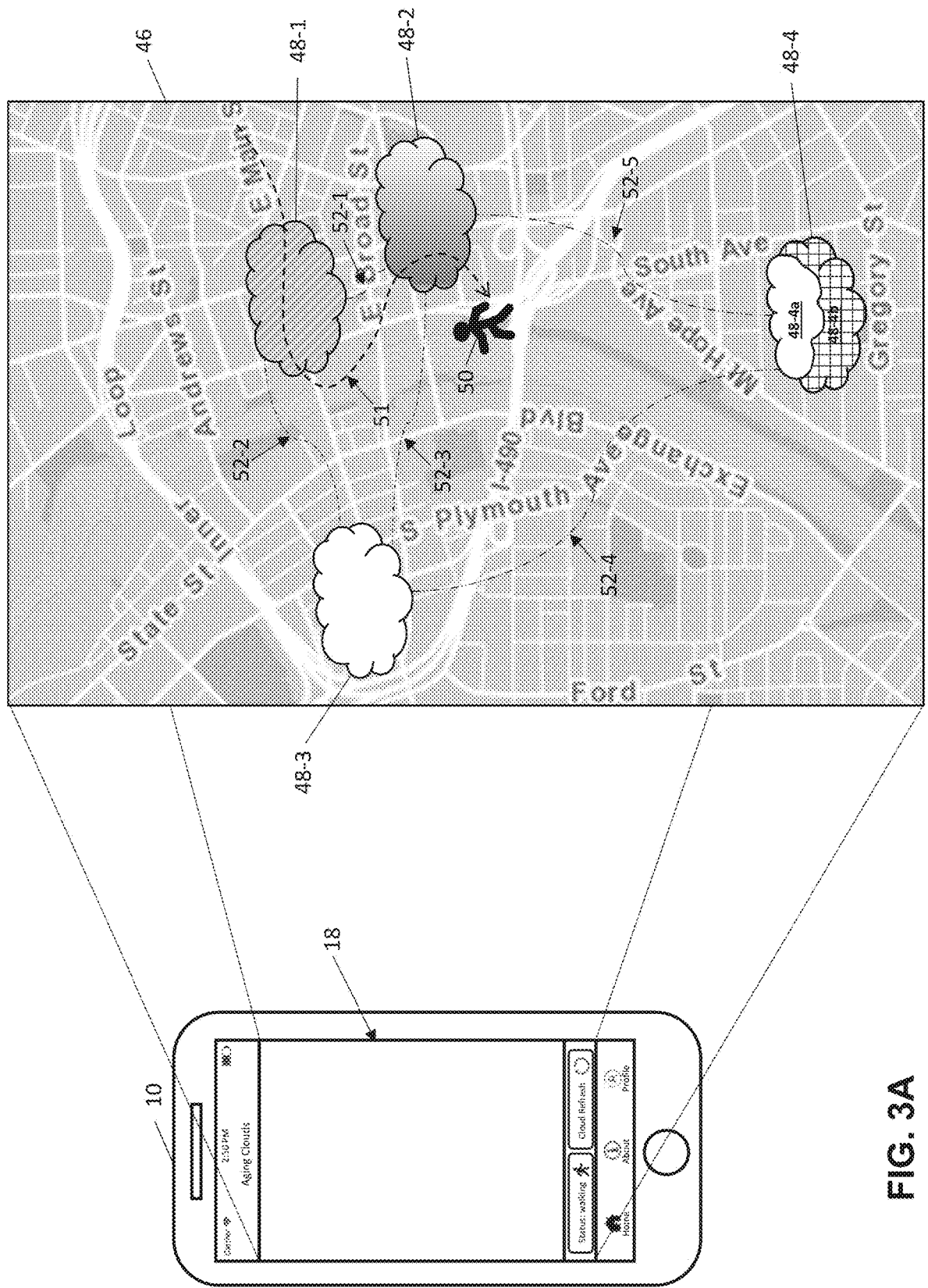
FIG. 3A is a planar view of a mobile phone on which a geographical map, including further aspects of the disclosed embodiments, is displayed.

As follows, the clouds 48 age and turn gray in the previously explored regions of the neighborhood. Referring to FIG. 3A, a cloud 48-1 is completely grayed out to indicate that the user has traversed, via path 51, within a threshold number of the points of interest associated with the area covered by cloud 48-1. In one example, traversal or viewing time is determined by sensing the position of the user 50, with respect to the threshold number of points of interest, through use of the GPS based position locating system 24 of FIG. 1, Additionally, the extent of cloud graying or aging can be controlled through use of both position locating as well assessing the time spent by the user at the threshold number of points of interest. The time spent at a given point of interest can be readily tracked with the mobile device 10 through suitable programming of local software component 28.

As further illustrated by cloud 48-2 of FIG. 3A, a gradient can be used to reflect that the user 50 has only traversed or viewed a portion of the area associated with cloud 48-2. This aging, i.e., transformation, of the clouds 48 readily serves to convey visual information regarding those areas (and thus points of interest) that have and have not been explored by the user 50. The aged clouds also help to reminiscence the past experiences when the user re-visits a place. In one embodiment, such reminiscing is aided by photos tagged as having been taken in the area of the cloud.

Additionally, hiding the interesting neighborhoods behind the translucent clouds 48, preserves the surprise of discovering new points of interest (POIs). This high-level visualization leads to playful interactions for serendipitous exploration, while still guiding the user. The user can choose to keep the surprise or get more details about the place by zooming into a given cloud. As used herein, points of interest include but are not limited the following attraction sites that a user may find interesting to discover: cultural attractions (e.g., monuments, museums, etc.), places of natural beauty (e.g., parks, beaches, mountains, etc.), architectural landmarks (e.g., iconic buildings and structures), and commercial attractions (e.g., stores, theaters, and restaurants).

Figure 3B:
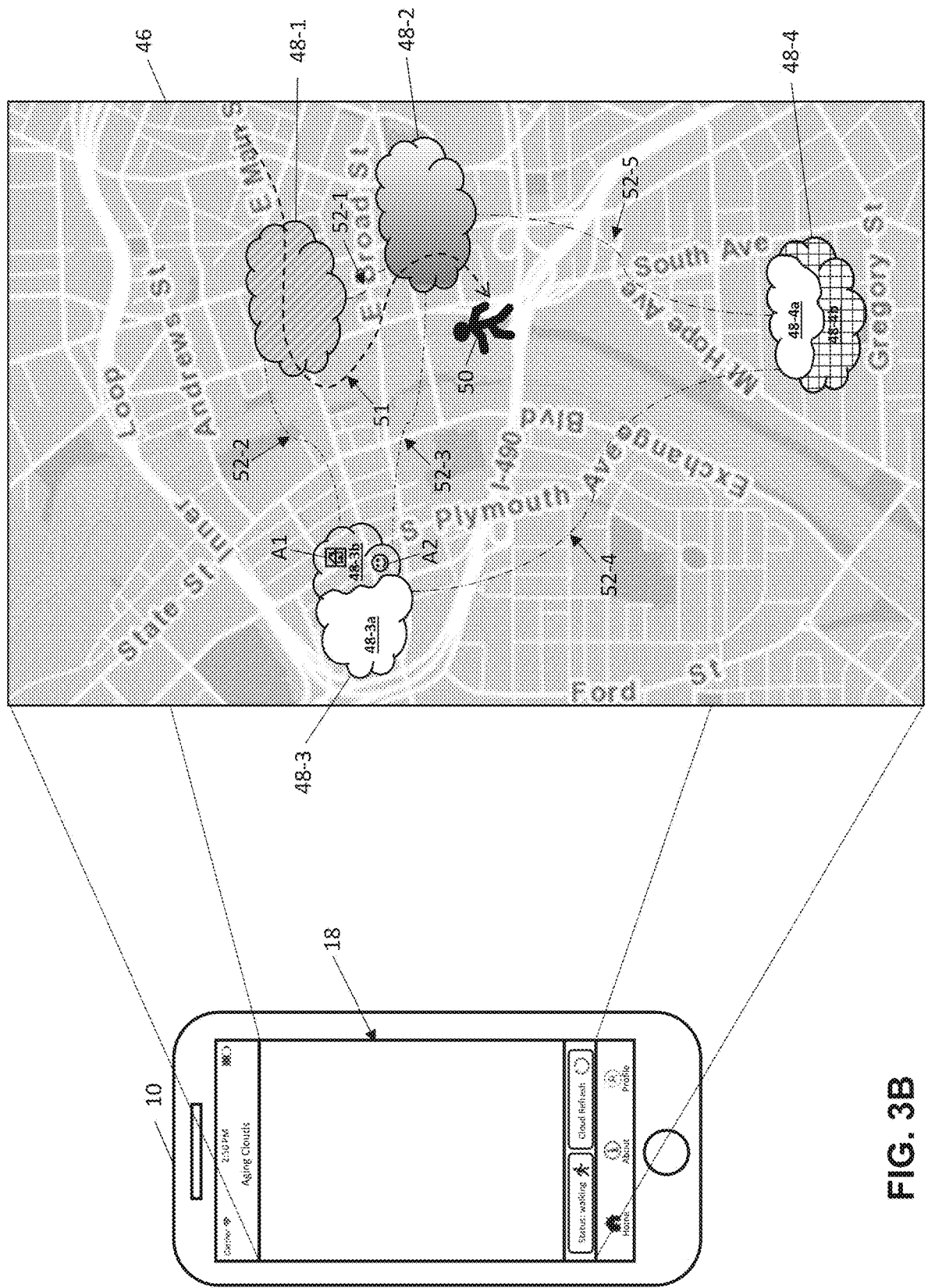
FIGS. 3B and 3C are planar views of a mobile phone on which a geographical map, including yet further aspects of the disclosed embodiments, is displayed.

Since comprehensive information about each POI is stored in memory of the server 32 or client computer 34, such as information about position location of a given POI and the type of interest with which the POI associated, a visual representation of the details (e.g., attraction sites) underlying a selected one of clouds 48 can be dynamically constructed on the map 46 (FIG. 3B) In one embodiment, these details may be made visible by permitting the user to zoom into a selected area underneath one of clouds 48, such as a selected area under cloud 48-3. As illustrated in FIG. 3B, when the user 50 zooms in on portion 48-3b of the cloud 48-3 but not portion 48-3a, the user can view one or more points of interest underlying the portion 48-3b the cloud 48-3, such as attraction sites A1 and A2. In another embodiment shown in FIG. 3C, only an indication of the category of the points of interest are revealed but not the location of attraction sites A1 and A2 in the portion 48-3*b* zoomed in by a user. These two embodiments may be used together, allowing the user 50 to zoom in slowly by first revealing the category of points of interest and then revealing their location.

It has been observed that providing too many clouds for a given geographical zone representation can be undesirable. Consequently, for many cities, the number of clouds or clusters constructed should be limited to a reasonable value. Additionally, one or more factors have been found to be useful in constructing patterns, such as clusters or clouds:

a. Popularity can serve as one factor in constructing clouds with one possibility being to construct the clouds on the basis of visits to or check ins at corresponding points of interest. The neighborhoods with a large number of check-ins are denoted as popular neighborhoods, and clouds could be positioned over these popular neighborhoods. Other features could be used to assess popularity, such as the number of likes expressed for a given neighborhood on social media and/or the entropy of the check-ins distribution, i.e., large number of in-frequent visitors vs a smaller number of dedicated visitors. Additionally, since venues in a city are typically not considered in isolation, popularity could be further assessed by considering the distribution of the categories of surrounding venues, weighted by a 2D Gaussian of arbitrary radius (e.g., r =350 meters).

b. Another factor considered in construction of clouds could include temporal dimension for changing the clouds constructed over time. Temporal clouds could be constructed by splitting up check-ins throughout a given day (week-day/Saturday/Sunday) by time intervals, such as four hour intervals—four hours in the morning, four hours in the afternoon and four hours in the evening. Different clouds could be used to represent the clouds at different times to better showcase their temporal nature to the user. For example, clouds of the morning time could be colored yellow, afternoon red, and evening violet.

c. Yet another factor considered in constructing clouds could include the types of interest for which a particular neighborhood is known. Based on a collection of geo-referenced social data of images from conventional social media platforms, such as Flickr®, Instagram® and Facebook®, psychological features, such as urban ambiance, can be derived. In one example, ambiance terms are matched with tags on Flickr® pictures, the Flickr® pictures being geo-referenced in London. The resulting ambiance tags are then aggregated at a neighborhood level so that the corresponding neighborhoods could be scored in terms of ambiance (as being, for instance, "creative", "cozy"). Using a known learning classification method, it is then possible to derive the neighborhood categories relating to fashion, student, red light, tourist, government, LGBT, residential, parks and leisure.

d. Yet another factor considered in construction clouds could include user preferences. A user may rank categories of points of interest. Clouds satisfying those points of interest may be identified from those clouds identified using the methods above to limit the number of clouds in a geographical zone representation. In one embodiment, a sliding scale may be controlled by the user on the mobile display to increase or decrease the number of clouds in a geographical zone based on the influence of the user's preferences to the number of clouds identified.

A study by the present inventors notes that an exploration profile of any given user can vary from someone who simply wanders about an urban area with no exploration plan to someone who explores the urban area in compliance with a strict exploration plan. In one example, the profile of an explorer could be obtained by administering a poll to the user, the poll seeking specific information regarding the explorer's exploring preferences, i.e., the approach used by the explorer in exploring a given urban area. Personal preferences of the users could be stored (in one of memories of the system of FIG. 1) and used in conjunction with the popularity factor, as described above, to select points of interest (POIs) for constructing clouds, thus maximizing efficiency by providing personalized clouds.

Referring specifically to cloud 48-4 of FIG. 3A, the color scheme of one or more of clouds 48 can be varied to reflect the richness of points of interest associated with each cloud. In one example, cloud 48-4 corresponds with an area (48-4*a*) having one category of points of interest (e.g., popular attraction sites) and another area (48-4*b*) having another category of points of interest (e.g., personally preferred sites). Notwithstanding the difference in appearance between 48-4*a* and 48-4*b*, the change in appearance of 48-4*a* and 48-4*b* to reflect aging or graying is similar to that for clouds 48-1 through 48-3.

The cloud metaphor was chosen one type of pattern because of its nature to cover the things underneath and for its flexibility in size, shape, density and color. Referring still to FIG. 3A, the clouds 48 are preferably constructed in view of one or more attributes. As follows from the description above, the attribute of color can readily be used to differentiate between explored and unexplored clouds. As illustrated in FIG. 3A, the initial set of unexplored clouds are represented to be floating over the map of an urban region of a city, initially represented in a selected color (such as blue). Later when the clouds are explored by the user, the parts of the clouds visited by the user are denoted with a different color (such as gray), thus, differentiating between the explored and unexplored clouds to help the user explore or forage better. As described above, clouds may be represented with different colors for different times of the day to showcase the temporal nature of the clouds. As further described above, different categories of interest such as night life, commercial, cultural, relaxing, fashion and design, may be represented with different colors or textures to differentiate between the categories. Notwithstanding the type of above-described factor employed for constructing various clouds, the clouds are generally aged in a similar ay, with a contrasting color (such as gray) to differentiate the degree of areal exploration.

Other attributes, such as shape, density and texture have been found to be useful in constructing the disclosed clouds. The shape of a cloud may be constructed directly to mirror the boundaries of interesting neighborhoods of the city. In one embodiment, the richness of content, e.g., the types of interest associated with a given neighborhood (as described above), may be represented with a larger density of the clouds. In yet another embodiment, the richness of content may be represented by the texture of a given cloud representation.

As should now appear, the map 46, the clouds 48 (which can "age" as a function of user exploration) and the current location of the user are important elements in terms of implementing the disclosed approach of unconstrained navigation. Per the disclosed approach, there is no preplanned path to follow or destination to reach. The users are free to move and find their own paths in the clouds. The disclosed approach seeks, among other things, to prevent the user from fixating on the mobile screen and to facilitate the enjoyment of the exploration with guidance for optimization.

As will be appreciated by those skilled in the art, the conceptual framework of the disclosed embodiments can be implemented with the system of FIG. 1 in several ways. In one example, a clickable prototype was programmed on a smartphone using sketchapp and mapbox. It is also contemplated that user interfaces of the type shown in FIGS. 2, 3A, 3B and 3C could be achieved through suitable programming at server 32 and/or client computer 34 (FIG. 1). In one example, such programming could readily be performed with reactJS and/or Javascript. Moreover, programming suitable for use with server 32 and client computer 34 in generating user interfaces for mobile device 10 is disclosed in U.S. Pat. No. 9,393,410, the entire disclosure of which is incorporated herein by reference. Further useful disclosure regarding the programming of a mobile device in the context of a system communicating with clients and servers across a network is provided in U.S. Pat. No. 9,066,199, the entire disclosure of which is incorporated herein by reference.

Figure 3C:
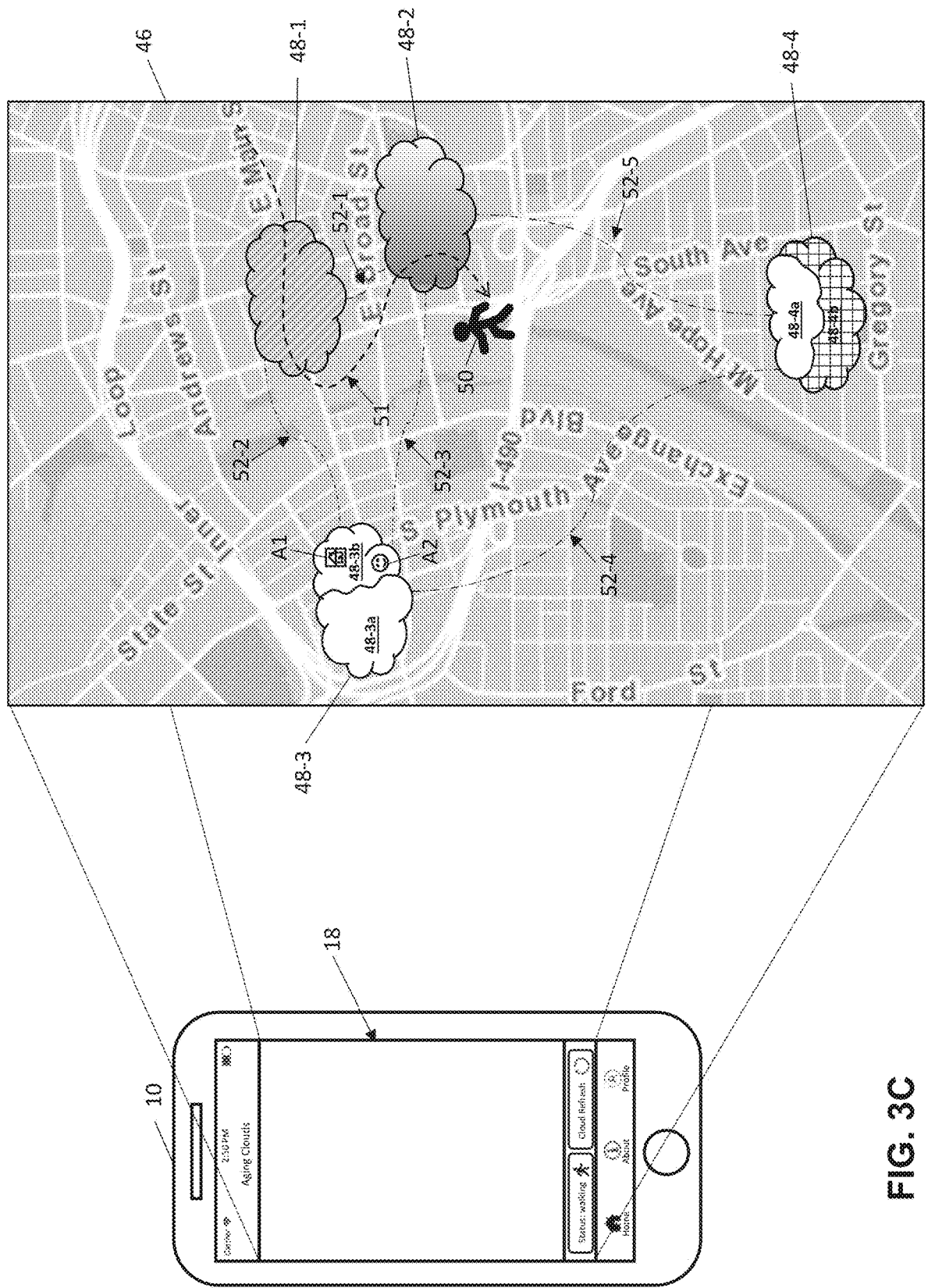

Referring to FIG. 3A, 3B, or 3C, the degree of connectivity between clouds 48, i.e., the ease of travel, is provided by way of connection lines (or "light threads") 52-1 through 52-5. Using, for example, the GPS system described above, these lines can be employed to provide the user with information regarding the absolute or relative distances between clouds. When used to provide relative distance, the connection lines can be labeled according to distance related categories, such as "close," "average," or "far away."

In one example of use, a line corresponding with close, such as the line labeled 52-1, can be displayed in a first color; a line corresponding with average, such as the line labeled 52-2 or 52-3, can be displayed in a second color, and a line corresponding with far away, such as the line labeled 52-4 or 52-5, can be displayed with a third color. In one example, the distances for the categories are as follows: close (<10 mn), average (>10 mn and <30 mn) and far away (>30 mn). By default, displayed distances are for walking; however, one embodiment contemplates an approach in which the user can switch between transport modes at any time. It will be appreciated that the connection lines or light threads 52, with their associated information regarding absolute and relative distances can be very useful in planning the extent to which a user can conveniently visit one or more points of interest within a given time period.

C. System Methods

Figure 4:
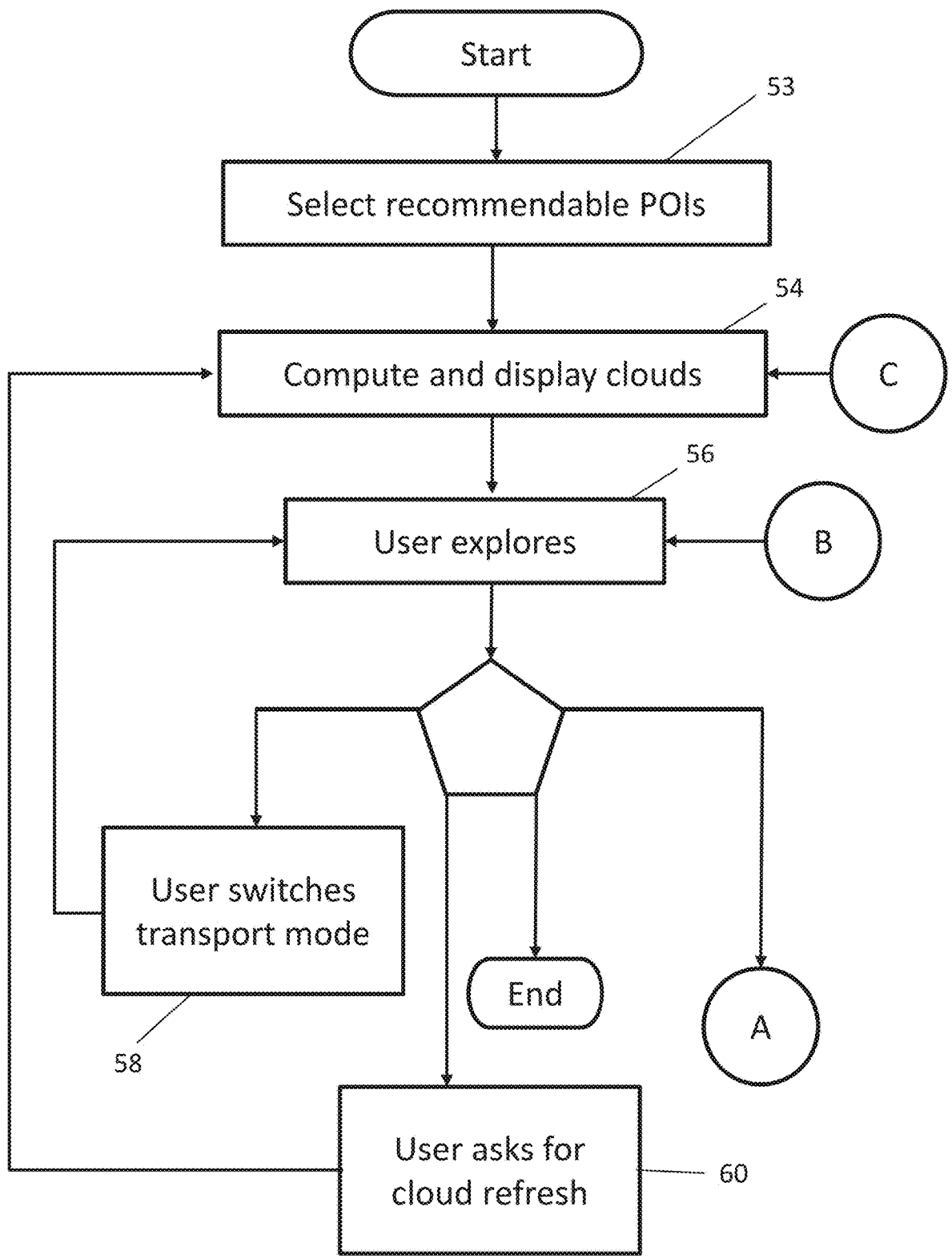
FIGS. 4 and 5 collectively comprise a flow chart representing an exemplary process for implementing a disclosed embodiment.
Figure 5:
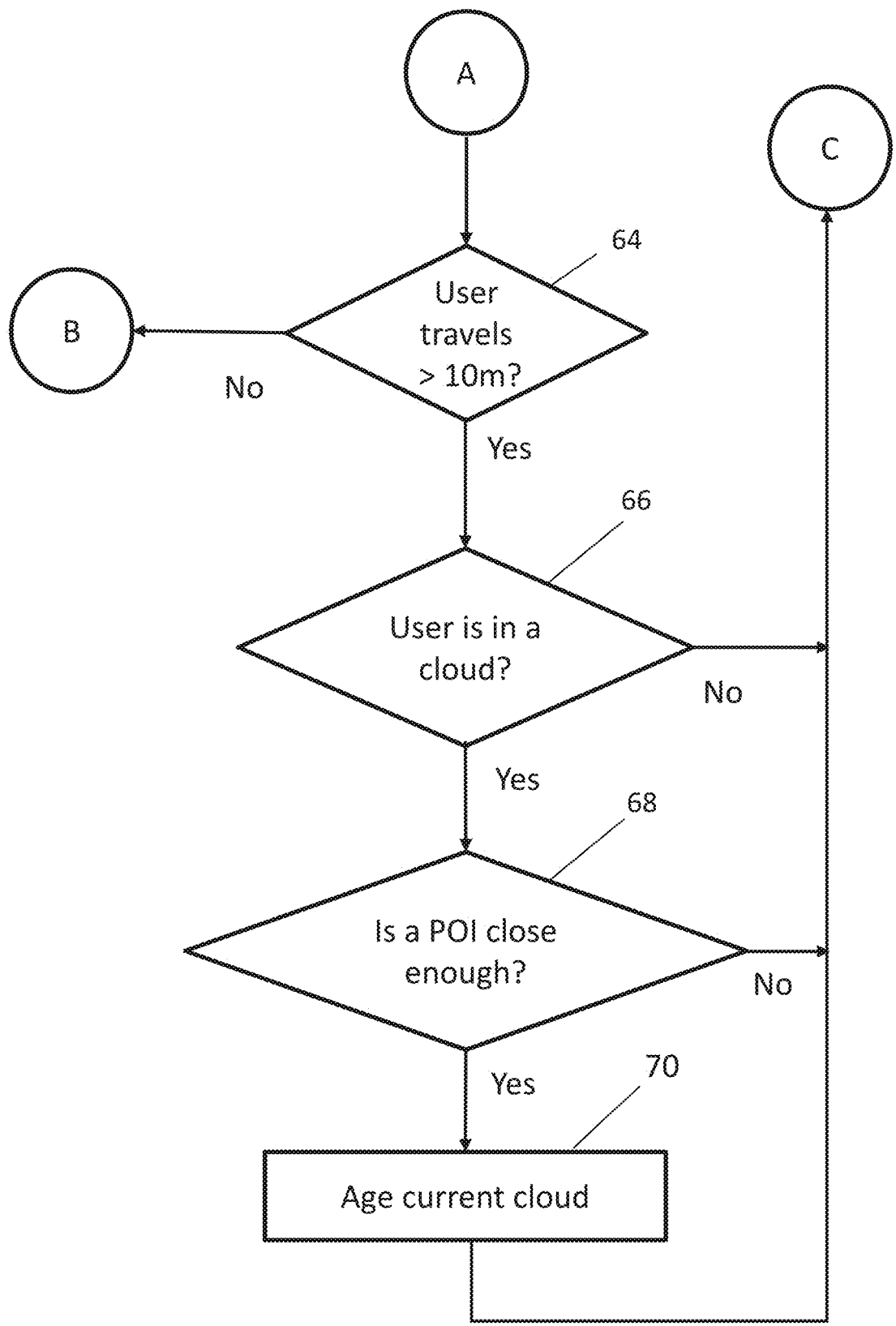

Referring still to FIG. 3A, 3B or 3C, as well as the flow chart of FIGS. 4 and 5, an exemplary process illustrating the operability of the disclosed embodiments is described. At step 53, the process selects a set of recommended POIs, these POIs being located near a current location of a user. Pursuant to the selection, a first filter is implemented using Euclidian distance: POIs located within a large circle around the user's current location (e.g., 5 km) are considered. Then, a second filter is implemented using the actual travel distance (in time) between the user and a POI. A routing engine (e.g., Open Source Routing Machine) may be used to filter out POIs that are more than 1 hour away from the user. When discarding POIs, both walking and public transport modes are considered in computing travel times.

Referring still to FIG. 4, at 54, a selected number of k clouds (k=5) are computed for a recommended number of POIs. Using any of the factors described above for constructing clusters of clouds, the process can be used, in conjunction with the above-described system of FIG. 1, to compute clouds (including locations, sizes, colors) and then display them on screen 18 (FIGS. 2, 3A, 3B and 3C). In conjunction with 54, the process computes travel distances in time between the user and each cloud. The distance between clouds can displayed by the travel time (for various travel modes, such as walking or riding) between the user and the closest POI of the cloud. Since this distance is recomputed as the user moves, computing with respect to a fixed POI, such as the most popular site or the POI at the center of a selected cloud, might be preferable for lowering computation time.

Referring still to FIG. 4, at 56, the user continues with exploration (also referred to as "foraging"), deciding toward which cloud she will proceed based on associated attractions sites (features) and/or distance to cloud(s). In conjunction with 56, the user may switch transport mode (58) and/or request a cloud refresh (60). At any time, the user can request the process to recompute all the clouds using the current user location—for instance, when the user moves toward an area where few clouds were displayed due to initial filtering.

Referring to both FIGS. 4 and 5, as the user proceeds with exploration, the distance traveled by the user is tracked with 64, and travel distance in time between the user and all of the clouds 48 is updated. Through detection with 66, the process determines when the user has entered a cloud and updates her exploration state as she walks a selected distance, such as every 10 meters. Pursuant to traversal through a given cloud, through use of 68 and 70, the process causes part or all or all of the given cloud to turn gray or "age."

If the user is within a selected distance of a POI of a cloud for a selected time interval, the POI is considered "explored." In turn, at least a portion of the cloud is transformed from one color, such as blue to another, such as gray. In one example, for a given cloud, the amount of gray computed for color transformation is based on the ratio of explored POIs to unexplored POIs. For purposes of computation, POIs can be weighted in accordance with some of the factors described above, such as popularity or personal preference. Consequently, for instance, exploring a few popular POIs may age a cloud quicker than visiting a greater number of less popular POIs.

In an alternate embodiment, the user may be given the option to set preferred categories of POIs, which may be selected from general categories of interest (e.g., museums) or specific categories of interest defined by a user (e.g., modern museums). Clouds with a greater number of POIs that fall within the user's preferred categories may be represented using specific colors as discussed above. In yet another embodiment, the user may be given the option to exclude categories of POIs from clouds.

Several advantages of the above-described embodiments will be appreciated by those skilled in the art:

a. First, a robust, visually based approach for promoting unconstrained exploration or "foraging" of a selected geographical zone, such as an urban area, is provided. The system readily permits a wide range of exploration by a user, employing a significant number of visual cues, without limiting the user to the sort of turn-by-turn navigation often associated with other navigation systems.

b. Second, by tracking the movement of the user relative to one or more patterns, such as colored or textured clouds displayed on a geographical map, the user is provided with a record of his exploration. Maintaining such record is particularly enhanced by providing clouds that turn partially or fully gray in response to the extent the user traverses by one or more points of interest associated with such clouds.

c. Third, an understanding of the variety of attraction sites associated with a given cloud is provided by employment of multi-colored clouds. In this way the user can readily visualize the different attraction site types associated with the given cloud, d. Fourth, the displayed map may be readily customized to optimize cloud construction. That is, clouds may be developed or differentiated on several basis of such factors as popularity, notoriety or ambiance of associated neighborhoods, check-ins throughout a given time period, and/or personal preferences for exploring. Through such customization, the exploring needs of many different types of users can be accommodated.

e. Finally, the connecting lines or "light threads" usable with the geographical map greatly enhances the user's ability to plan exploration. By visibly illustrating the relative distances between clouds, in terms of multiple transport modes, the user can readily assess the amount of exploration possible during a given time period.

While particular embodiments have been described, alternatives, modifications, variations, improvements, and substantial equivalents that are or may be presently unforeseen may arise. Accordingly, the appended claims as filed and as they may be amended are intended to embrace all such alternatives, modifications variations, improvements, and substantial equivalents.

What is claimed is:

1. A method for using a handheld computer with a screen and one or more processor circuits to navigate about a selected geographical zone, comprising:

by the one or more processor circuits, displaying, on the screen of the handheld computer, an image representative of a geographical map of the selected geographical zone, the selected geographical zone including a plurality of points of interest, each of which is associated with a location and category; wherein (a) at least two of the plurality of points of interest are clustered into at least one viewing area, (b) the at least one viewing area is distinguished by a pattern having a selected appearance that obscures the locations and categories associated with the at least two of the plurality of points of interest, and (c) the pattern having the selected appearance corresponds with at least one of a first visual state and a second visual state with the pattern obscuring the at least two of the plurality of points of interest in each one of the first and second visual states;

by the one or more processor circuits, determining, with a geographical position locating subsystem, when a user of the handheld computer has physically approached one or more of the at least two of the plurality of points of interest within a selected distance thereof; and by the one or more processor circuits, responsive to determining that the user of the handheld computer has physically approached the one or more of the at least two of the plurality of points of interest within the selected distance, automatically changing the selected appearance of the pattern on the screen of the handheld computer from the first visual state to the second visual state (I) to reflect an extent to which the user of the handheld computer has physically approached the one or more of the at least two of the plurality of points within the selected distance and (II) at a rate of change that increases as popularity of the one or more of the at least two of the plurality of points within the selected distance, determined using geo-referenced social media data, increases.

2. The method of claim 1 in which the pattern comprises a representation of a cloud possessing a first color, wherein said automatically changing the selected appearance of the pattern includes, by the one or more processor circuits, automatically changing the representation of the cloud from the first color to a second color with the change in color corresponding with the extent to which the user of the handheld computer has physically approached the one or more of the at least two of the plurality of points of interest within the selected distance.

3. The method of claim 1 in which the pattern comprises a first pattern and the geographical map is configured to include a second pattern spaced from the first pattern, further comprising by the one or more processor circuits, providing the geographical map with a visually distinguishable line connecting the first and second patterns on the screen of the handheld computer, wherein the visually distinguishable line corresponds with one of a plurality of relative distance categories.

4. The method of claim 1 in which (d) the pattern comprises a representation of a cloud divided into a first representative part having a first color and a second representative part having a second color and (e) one part of the at least two of the plurality of points of interest are clustered into the first representative part of the cloud and another part of the at least two of the plurality of points of interest are clustered into the second representative part of the cloud, wherein:

said automatically changing the selected appearance of the at least a portion of the pattern includes, by the one or more processor circuits, either changing the first representative part of the cloud from the first color to a third color or changing the second representative part of the cloud from the second color to the third color on the screen of the handheld computer.

5. The method of claim 1, wherein the geographical position locating subsystem uses a GPS (global positioning subsystem) to determine when the user of the handheld computer is within the selected distance.

6. The method of claim 1 in which the pattern comprises a representation of a cloud with at least part of the representation of the cloud corresponding to a first color during a first time of a day and the at least part of the representation of the cloud corresponds to a second color during a second time of the day, wherein said automatically changing the selected appearance of the pattern includes, by the one or more processor circuits, changing the at least part of the representation of the cloud from either the first color to a third color or the second color to the third color on the screen of the handheld computer.

7. The method of claim 1, in which the at least one viewing area on the screen of the handheld computer corresponds with at least part of a selected urban neighborhood, further comprising, by the one or more processor circuits, selecting the at least part of the selected urban neighborhood on the basis of either perceived popularity of the selected urban neighborhood or points of interest in the selected urban neighborhood.

8. The method of claim 1, in which the user of the handheld computer has expressed personal preferences for exploring the selected geographical zone and the at least one viewing area on the screen of the handheld computer corresponds with at least part of a selected urban neighborhood, further comprising, by the one or more processor circuits, selecting the at least part of the selected urban neighborhood on the basis of the personal preferences for exploring the selected geographical zone.

9. The method of claim 1, wherein said determining includes using the geographical position locating subsystem to assess an amount of time spent by the user of the handheld computer at one or more of the at least two of the plurality of points of interest within the selected distance, and wherein said automatically changing includes automatically changing the selected appearance of the pattern from the first visual state to the second visual state when the user of the handheld computer has both physically approached the one or more of the at least two of the plurality of points of interest within the selected distance and has spent a selected amount of time within the selected distance of the one or more of the at least two of the plurality of points of interest.

10. A method for using a handheld computer with a screen and one or more processor circuits to navigate about a selected geographical zone, comprising:

by the one or more processor circuits, displaying, on the screen of the handheld computer, an image representative of a geographical map of the selected geographical zone, the selected geographical zone including a plurality of points of interest without revealing locations or categories of the points of interest; wherein (a) a first part of the plurality of points of interest are clustered within a visual representation of a first cloud with at least a part of the first cloud being displayed as a first color to indicate that a user of the handheld computer has yet to traverse the first part of the plurality of points of interest, (b) a second part of the plurality of points of interest are clustered within a visual representation of a second cloud with at least a part of the second cloud being displayed as a second color to indicate that the user of the handheld computer has yet to traverse the second part of the plurality of points of interest, and (c) the visual representation of the first cloud is displayed as being spaced from the visual representation of the second cloud, and (d) the representation of the first cloud is visually connected to the representation of the second cloud by a visually distinguishable line with the visually distinguishable line corresponding with one of a plurality of relative distance categories;

by the one or more processor circuits, determining, with a geographical position locating subsystem, when a selected relationship exists between the user of the handheld computer and of one or more of the points of interest;

by the one or more processor circuits, responsive to determining that the selected relationship exists between the user of the handheld computer and of one or more of the points of interest, automatically change the visual representation of the first cloud from the first color to a third color to indicate that the user of the handheld computer has traversed a physical area corresponding with the first part of the plurality of points of interest; and by the one or more processor circuits, responsive to the user of the handheld computer being within a selected distance of one or more of the second part of the plurality of points of interest for a selected time interval, automatically changing the visual representation of the second cloud from the second color to the third color (I) to indicate that the user of the handheld computer has traversed a physical area corresponding with the second part of the plurality of points of interest and (II) at a rate of change that increases as popularity of the second part of the plurality of points of interest, determined using geo-referenced social media data, increases.

11. A method for using a handheld computer with a screen and one or more processor circuits to navigate about a selected geographical zone, comprising:

by the one or more processor circuits, displaying, on the screen of the handheld computer, an image representative of a geographical map of the selected geographical zone, the selected geographical zone including a plurality of points of interest each of which is associated with a location and a category; wherein (a) at least two of the plurality of points of interest are clustered into an area on the geographical map with the area being covered by a representation of a cloud with the cloud obscuring the location and category with which each of the plurality of points of interest is associated, and (b) the representation of the cloud corresponds with a first color in one visual state and second color in a second visual state, the cloud obscuring the locations and categories of the at least two of the plurality of points of interest in each one of the first visual state and the second visual state;

by the one or more processor circuits, determining, with a geographical position locating subsystem, if a selected physical relationship exists between the user of the handheld computer and one or more of the at least two of the plurality of points of interest; and by the one or more processor circuits, responsive to determining that the selected physical relationship exists between the user of the handheld computer and the one or more of the at least two of the plurality of points of interest, automatically changing the visual state of the representation of the cloud from the first color to the second color (I) for visually indicating an extent to which the user of the handheld computer has physically approached the area on the geographical map in which the two of the plurality of points of interest are clustered and (II) at a rate of change that increases as popularity of the two of the plurality of points of interest, determined using geo-referenced social media data, increases.

12. The method of claim 11, wherein said determining includes using the geographical position locating subsystem to determine when the user of the handheld computer is physically within a selected distance of the one or more of the at least two of the plurality of points of interest, and wherein said automatically changing includes automatically changing the representation of the cloud from the first visual state to the second visual state when the user of the handheld computer is within a selected distance of the one or more of the two of the plurality of points of interest.

13. The method of claim 11, wherein said determining includes using the geographical position locating subsystem to assess an amount of time spent by the user of the handheld computer at one or more physical sites within the selected geographical zone, and wherein said automatically changing the selected appearance of the representation of the cloud from the first visual state to the second visual state when the amount of time spent by the user of the handheld computer at the one or more physical sites within the selected geographical zone exceeds a selected threshold.

14. The method of claim 11 in which the geographical map on the screen of the handheld computer includes first and second cloud representations, further comprising, by the one or more processor circuits, providing the geographical map with a visually distinguishable line connecting the first and second cloud representations, wherein the visually distinguishable line corresponds with one of a plurality of relative distance categories.

15. The method of claim 11 in which (i) the representation of the cloud on the screen of the handheld computer is divided into a first representative part having the first color and a second representative part having a third color and (ii) one or more of the at least two of the plurality of points of interest are disposed under the first representative part of the cloud and one or more of the at least two of the plurality of points of interest are disposed under the second representative part of the cloud, wherein:

said automatically changing the visual state of the representation of the cloud on the screen of the handheld computer includes either changing the first representative part of the cloud from the first color to the second color or changing the second representative part of the cloud from the third color to the second color.

16. The method of claim 15, wherein said automatically changing the visual state of the representation of the cloud on the screen of the handheld computer from the first color to the second color occurs at one time during a day, and wherein said automatically changing the visual state of the representation of the cloud from the third color to the second color occurs at another time during the day.

17. The method of claim 11, in which the representation of the cloud on the screen of the handheld computer corresponds with at least part of a selected urban neighborhood, further comprising, by the one or more processor circuits, selecting the at least part of the selected urban neighborhood on the basis of either perceived popularity of the selected urban neighborhood or points of interest in the selected urban neighborhood.

18. The method of claim 11, in which the user of the handheld computer has expressed personal preferences for exploring the selected geographical zone on the screen of the handheld computer and the representation of the cloud corresponds with at least part of a selected urban neighborhood, further comprising, by the one or more processor circuits, selecting the at least part of the selected urban neighborhood on the basis of the personal preferences for exploring the selected geographical zone.

19. The method of claim 11, wherein the handheld computer comprises a cellular telephonic device including the display and the one or more processor circuits and wherein each of said displaying, said determining and said automatically changing is performed on the cellular telephonic device.

20. The method of claim 1, wherein the handheld computer comprises a cellular telephonic device including the display and the one or more processor circuits, and wherein said each of said displaying, said determining and said automatically changing is performed on the cellular telephonic device.

* * * * *